Figure 1:
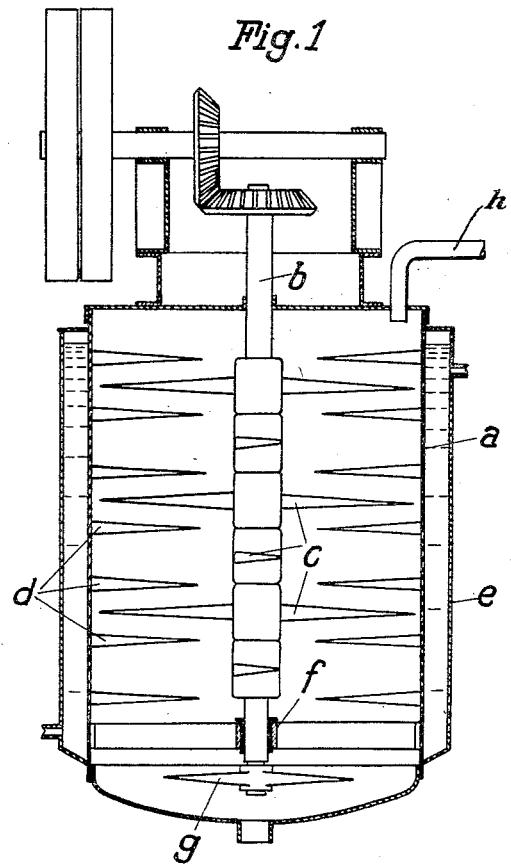

Patented Nov. 1, 1932

1,886,020

UNITED STATES PATENT OFFICE

FRITZ HOYER, OF KOTHEN, GERMANY, ASSIGNOR TO A. G. FUR HALBZELLSTOFF-INDUSTRIE, OF BASEL, SWITZERLAND, A CORPORATION OF SWITZERLAND

PROCESS OF AND APPARATUS FOR TREATING FIBROUS MATERIAL

Application filed October 14, 1930, Serial No. 488,642, and in Germany August 29, 1930.

This invention relates to a process of and apparatus for treating fibrous material, and more particularly to a process of and apparatus for treating said material and rendering the same more suitable for being further worked up into cellulose.

The raw materials which have heretofore been used in the cellulose industry had heretofore been exclusively disintegrated in a chemical way and large quantities of chemicals, complicated apparatus and a great amount of time had been required for proper disintegrating treatment. In consequence of this, heretofore the preparatory treatment of raw materials of the aforementioned kind had been confined to countries having a large industry. Most of the raw materials used in the cellulose industry, especially rapidly growing and cheaply obtainable raw materials are products of tropical countries and, as a rule, do not exist in industrial countries. In tropical countries, however, the chemicals necessary for the treatment of said material cannot well be conserved and, in addition, cannot be manufactured owing to the absence of industry. It had heretofore been necessary to import the originally cheap raw materials which grow abundantly in tropical countries into industrial countries, with the result that the price of the imported raw materials will be considerably in excess of the original prices, especially in view of the fact that the raw materials contain a great amount of water which represents dead freight. This is especially the case with wood. Other tropical raw materials, such as bamboo-cane and tropical grasses, on the other hand, represent an extremely bulky load resulting in unreasonably high freight rates. For these reasons endeavors have been made for a considerable time by the industry to devise processes and apparatus permitting to prepare the originally cheap raw materials at their natural places of growth without any large amount of apparatus and to avoid the high freight rates to industrial countries where the materials are subjected to further treatment.

This invention provides a solution of this problem. According to this invention coarsely comminuted raw materials which contain cellulose and fibers, such as for instance wood, bamboo, cotton-stalks, sugar-cane and all kinds of reed, grass, straw and so forth are mixed with a liquid, preferably water, and the mixture so obtained rapidly rotated and carried at great velocity against cutting organs provided within the container for said mixture. By so treating the coarse raw material it will be wholly or partly freed from incrustations, foreign matter and the like and the fiber of the material disintegrated by the impact of the material upon said cutting organs as well as by the effect of friction which is generated by centrifugal force.

When carrying out the new process which forms part of this invention, it has been found that sometimes mucous matter will be formed and that discoloration of the material will take place, the extent of formation of mucous matter and of the discoloration varying with different materials. Discoloration especially is due to the transposition of incrustations. It has further been found that the formation of mucous matter and discoloration of the material are due to excessive temperatures and will take place to an increased extent, especially in case the working temperature exceeds 80° C., these temperatures being the result of friction. According to this invention, therefore, the temperatures are maintained during the entire time of treatment and kept at a value which does not or not essentially exceed 80° C. For some raw materials, for instance cotton-stalks, and certain grasses, a temperature of from 60–70° C. has been found particularly suitable. For some raw materials it has further been found to be preferable to add to the disintegrating liquid chemicals that do not deteriorate in tropical countries, such as lime, soda, Glauber's salt and the like, said chemicals being at the same time able to expedite the mechanical disintegration of the fibers, for instance, by dissolving incrustations.

Figure 2:
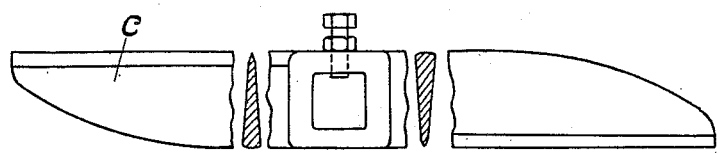

Figs. 1 and 2 of the accompanying drawing show an apparatus for carrying out the aforementioned process of mechanical disintegration, in which Fig. 1 is a diagrammatic longitudinal section and Fig. 2 is a top view of one of the blades. The apparatus consists of a drum a and a shaft b mounted rotatably within said drum. The shaft b is provided with agitator blades or arms c having the form of cutters by means of which the raw material which preliminarily has been coarsely comminuted and mixed with water may be rapidly rotated. On the interior surface of the drum a there are provided the members d, which are likewise in the form of cutters fixed upon the interior surface of the drum in radial direction thereof. The cutters or cutting elements d are properly displaced or staggered vertically with respect to the agitator arms c on the shaft d permitting said arms upon rotation to pass through the spaces between the cutters d interiorly on the drum a. Upon rotation of the shaft b and the agitator arms c the material will likewise be rotated and thrown at a high velocity against the cutters d with the result that it will be wholly or partly freed from incrustations, foreign matter and the like and the fiber properly disintegrated.

An especially favorable profile for the rotary arms, or cutters c on the shaft b has been found to be of the form shown in Fig. 2, the cutters in this case having a re-inforced back which is so bent that the parts of the cutters which are directed towards the interior surface of the drum are made of a smaller width than the parts in proximity to the shaft. This form and profile of the rotary arms or cutters will effectively prevent the formation of eddies at the rear thereof and a flow of liquid in a direction against the centrifugal force.

Under the bearing f for the shaft, there is provided a special pair of agitator arms g destined to stir up material which may eventually deposit at the bottom of the drum for the purpose of again properly carrying this material through the cutting elements.

As above mentioned, care must be taken to prevent the material while being treated in the drum against assuming a temperature exceeding a certain value. For this reason the drum may be provided with a cooling device, for instance, with a cooling jacket e.

The heat necessary for the treatment of the material will be developed essentially as a result of friction arising during rotation of shaft b and the agitator arms c in all masses which rotate within the drum. In the case of treating certain raw materials which are not suited to withstand a long time of treatment, it will be preferable to use preliminarily heated water at the start of the treatment. Also an additional heating device, for instance a steam conduit h, may be used in this case, said heating device being put into and out of operation at the start of the process, after the material has reached a certain temperature, respectively. If at this time the process has not yet been completed, the cooling device may eventually be used to prevent excessive heating.

I claim:

1. A process of preparing a vegetable cellulose-containing raw material, said process consisting in mixing said material with water having a temperature not exceeding 80° C., carrying the mixture so obtained at high velocity and with the aid of centrifugal force generated within said mixture against cutting elements, producing a temperature not exceeding 80° C. within said mixture by action of friction, supplying hot steam to said mixture, until a temperature not exceeding 80° C. is produced therein, and continuing motion of said mixture against said cutting elements, until the fibers have been disintegrated from the structure of said material.

2. A process of preparing a vegetable cellulose-containing raw material, said process consisting in mixing said material with water of a temperature not exceeding 80° C. in the presence of lime, and carrying the mixture at high velocity and with the aid of centrifugal force generated within said mixture against cutting elements, producing a temperature not exceeding 80° C. within said mixture by action of friction, supplying heat produced outside of said mixture thereto, until a temperature not exceeding 80° C. is attained, and continuing motion of said mixture against said cutting elements at a temperature not exceeding 80° C., until the fibers have been disintegrated from the structure of said material.

3. A process of preparing a vegetable cellulose-containing raw material, said process consisting in mixing said material with water of a temperature not exceeding 80° C. in the presence of soda, and carrying the mixture at high velocity and with the aid of centrifugal force generated within said mixture against cutting elements, producing a temperature not exceeding 80° C. within said mixture by action of friction, supplying heat produced outside of said mixture thereto, until a temperature not exceeding 80° C. is attained, and continuing motion of said mixture against said cutting elements at a temperature not exceeding 80° C., until the fibers have been disintegrated from the structure of said material.

4. A process of preparing a vegetable cellulose-containing raw material, said process consisting in mixing said material with water of a temperature not exceeding 80° C. in the presence of Glauber's salt, and carrying the mixture at high velocity and with the aid of centrifugal force generated within said mixture against cutting organs, producing a temperature not exceeding 80° C. within said mixture by action of friction, supplying heat produced outside of said mixture thereto, until a temperature not exceeding 80° C. is attained, and continuing motion of said mixture against said cutting elements at a temperature not exceeding 80° C., until the fibers have been disintegrated from the structure of said material.

5. Apparatus for preparing vegetable cellulose-containing raw materials, said apparatus comprising a drum, cutting elements fast on said drum and projecting radially into the interior thereof, a shaft concentrically mounted within said drum, at least one bearing provided in proximity to the bottom of said drum for mounting said shaft, means for rapidly rotating said shaft, agitator arms provided on said shaft above said bearing, and a pair of agitator arms mounted on an extension of said shaft underneath said bearing in proximity to the bottom of said drum, said pair of agitator arms adapted to again convey parts of said material which may have deposited at the bottom of said drum towards said cutting elements.

6. Apparatus for preparing vegetable cellulose-containing raw materials, said apparatus comprising a drum, cutting elements fast on said drum and projecting radially into the interior thereof, a shaft concentrically mounted within said drum, at least one bearing provided in proximity to the bottom of said drum for mounting said shaft, means for rapidly rotating said shaft, agitator arms provided on said shaft above said bearing, a pair of agitator arms mounted on an extension of said shaft underneath said bearing in proximity to the bottom of said drum, said pair of agitator arms adapted to again convey parts of said material which may have deposited at the bottom of said drum towards said cutting elements, and means for introducing hot water-steam into the interior of said drum.

7. Apparatus for preparing vegetable cellulose-containing raw materials, said apparatus comprising a drum, cutting elements fast on said drum and projecting radially into the interior thereof, a shaft concentrically mounted within said drum, at least one bearing provided in proximity to the bottom of said drum for mounting said shaft, means for rapidly rotating said shaft, agitator arms provided on said shaft above said bearing, a pair of agitator arms mounted on an extension of said shaft underneath said bearing in proximity to the bottom of said drum, said pair of agitator arms adapted to again convey parts of said material which may have deposited at the bottom of said drum towards said cutting elements, and means for cooling the contents of said drum.

8. Apparatus for preparing vegetable cellulose-containing raw materials, said apparatus comprising a drum, cutting elements fast on said drum and projecting radially into the interior thereof, a shaft concentrically mounted within said drum, at least one bearing provided in proximity to the bottom of said drum for mounting said shaft, means for rapidly rotating said shaft, agitator arms provided on said shaft above said bearing, a pair of agitator arms mounted on an extension of said shaft underneath said bearing in proximity to the bottom of said drum, said pair of agitator arms adapted to again convey parts of said material which may have deposited at the bottom of said drum towards said cutting elements, a jacket associated with said drum and means for passing liquid through said jacket to come in contact with the outer surface of said drum.

In testimony whereof I affix my signature.

FRITZ HOYER.